United States Patent
Shi et al.

(10) Patent No.: US 12,530,279 B2
(45) Date of Patent: Jan. 20, 2026

(54) COMPONENT TO DETERMINE TEST STEPS CONFLICTS IN A FIRMWARE TEST

(71) Applicant: DELL PRODUCTS L.P., Round Rock, TX (US)

(72) Inventors: Jie Ru Shi, Shanghai (CN); Zhang Qin, Shanghai (CN); Dong Xiaoxuan, Shanghai (CN); Xiaowei Shen, Shanghai (CN); Tian Yu Zheng, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 292 days.

(21) Appl. No.: 18/447,801

(22) Filed: Aug. 10, 2023

(65) Prior Publication Data

US 2024/0427695 A1     Dec. 26, 2024

(30) Foreign Application Priority Data

Jun. 20, 2023   (CN) .......................... 202310738802.1

(51) Int. Cl.
 *G06F 11/3668*    (2025.01)
 *G06N 20/00*     (2019.01)

(52) U.S. Cl.
 CPC ......... *G06F 11/3684* (2013.01); *G06N 20/00* (2019.01)

(58) Field of Classification Search
 CPC .............................. G06N 11/36; G06N 20/00
 See application file for complete search history.

(56) References Cited

U.S. PATENT DOCUMENTS

| | | | |
|---|---|---|---|
| 11,256,609 B1 * | 2/2022 | Agrawal | G06F 11/3684 |
| 11,422,788 B2 | 8/2022 | Samuel et al. | |
| 11,513,927 B1 * | 11/2022 | Kanagovi | G06N 20/20 |
| 2017/0199811 A1 * | 7/2017 | Narayan | G06F 11/368 |
| 2023/0112734 A1 | 4/2023 | Suryanarayana et al. | |
| 2023/0251960 A1 * | 8/2023 | Sharma | G06N 5/04 |
| | | | 717/124 |
| 2023/0401469 A1 * | 12/2023 | Papadopoulos | G06N 20/00 |

FOREIGN PATENT DOCUMENTS

CN          117950975 A   *   4/2024   .......... G06F 11/2733

OTHER PUBLICATIONS

"OOM Test Baseline Mechanism Based on Intelligent Score" (Year: 2022).*

* cited by examiner

*Primary Examiner* — Ziaul A Chowdhury
(74) *Attorney, Agent, or Firm* — Larson Newman, LLP

(57) ABSTRACT

An information handling system stores a list of commands associated with test cases. The system receives the list of commands associated with the test cases, and provides the list of commands to an input layer of a state attributes probability machine learning model. An output layer of the of the state attributes probability machine learning model outputs a state attributes probability. The state attributes probability identifies an overlap of state attributes of test steps in the test cases. Based on the state attributes probability, the system determines whether the test steps of the test cases are in conflict. In response to the test steps not being in conflict, the system merges the test cases. In response to the test steps being in conflict, the system stops a merging of the test cases.

16 Claims, 5 Drawing Sheets

COMPONENT TO DETERMINE TEST STEPS CONFLICTS IN A FIRMWARE TEST

FIELD OF THE DISCLOSURE

The present disclosure generally relates to information handling systems, and more particularly relates to a component to determine test steps conflicts in a firmware test.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory and a processor. The memory may store a list of commands for the information handling system, and the list of commands is associated with test cases. The processor may receive the list of commands associated with the test cases. The processor may provide the list of commands to an input layer of a state attributes probability machine learning model. An output layer of the of the state attributes probability machine learning model may output a state attributes probability. The state attributes probability identifies an overlap of state attributes of test steps in the test cases. Based on the state attributes probability, the processor may determine whether the test steps of the test cases are in conflict. In response to the test steps not being in conflict, the processor may merge the test cases. In response to the test steps being in conflict, the processor may stop a merging of the test cases.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
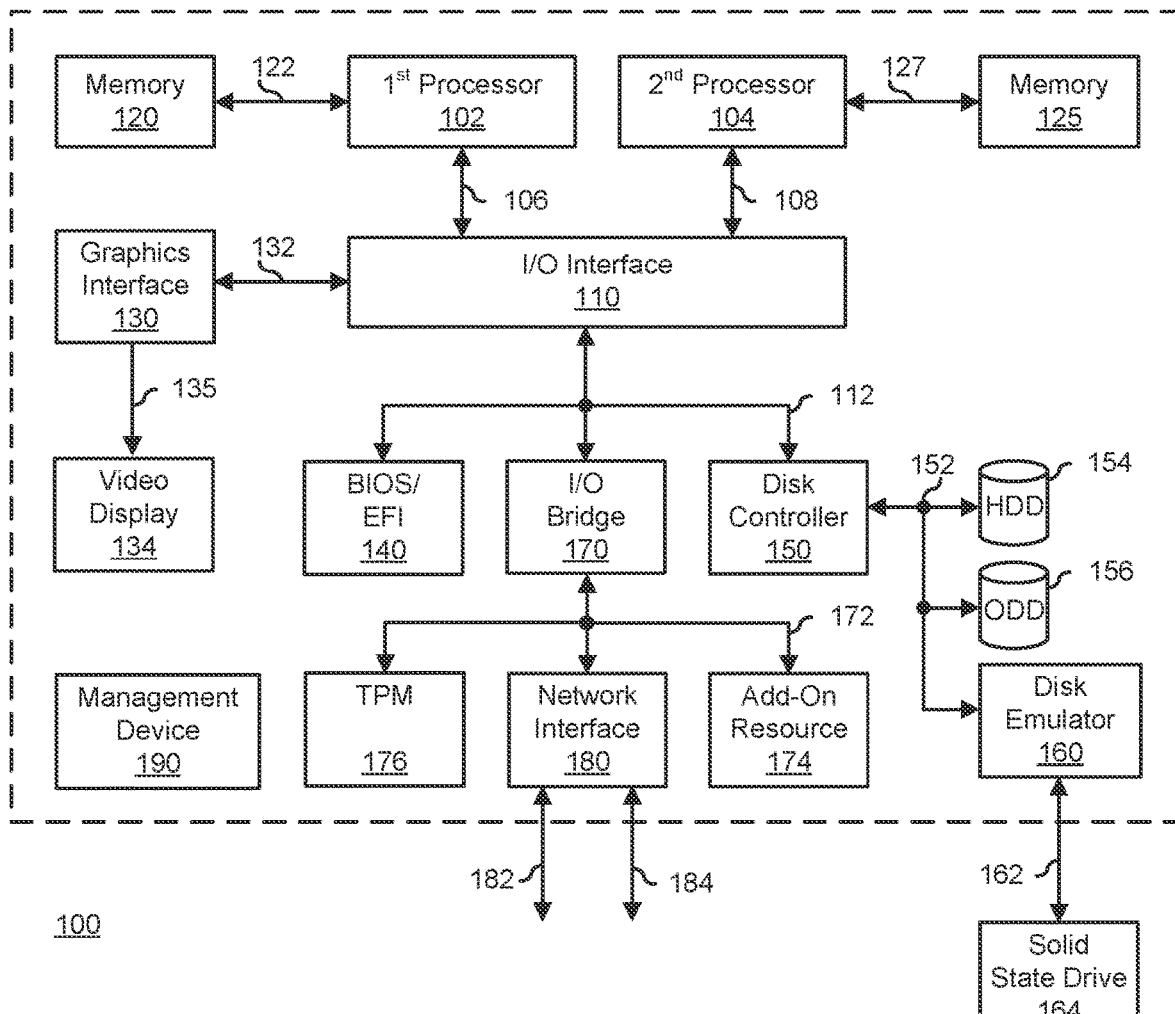
FIG. 1 is a block diagram of a general information handling system according to an embodiment of the present disclosure.

FIG. 1 shows a generalized embodiment of an information handling system 100 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data.

Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below and operates to perform one or more of the methods described below. Information handling system 100 includes a processors 102 and 104, an input/output (I/O) interface 110, memories 120 and 125, a graphics interface 130, a basic input and output system/universal extensible firmware interface (BIOS/UEFI) module 140, a disk controller 150, a hard disk drive (HDD) 154, an optical disk drive (ODD) 156, a disk emulator 160 connected to an external solid state drive (SSD) 162, an I/O bridge 170, one or more add-on resources 174, a trusted platform module (TPM) 176, a network interface 180, a management device 190, and a power supply 195. Processors 102 and 104, I/O interface 110, memory 120, graphics interface 130, BIOS/UEFI module 140, disk controller 150, HDD 154, ODD 156, disk emulator 160, SSD 162, I/O bridge 170, add-on resources 174, TPM 176, and network interface 180 operate together to provide a host environment of information handling system 100 that operates to provide the data processing functionality of the information handling system. The host environment operates to execute machine-executable code, including platform BIOS/UEFI code, device firmware, operating system code, applications, programs, and the like, to perform the data processing tasks associated with information handling system 100.

In the host environment, processor 102 is connected to I/O interface 110 via processor interface 106, and processor 104 is connected to the I/O interface via processor interface 108. Memory 120 is connected to processor 102 via a memory interface 122. Memory 125 is connected to processor 104 via a memory interface 127. Graphics interface 130 is connected to I/O interface 110 via a graphics interface 132 and provides a video display output 136 to a video display 134. In a particular embodiment, information handling system 100 includes separate memories that are dedicated to each of processors 102 and 104 via separate memory interfaces. An example of memories 120 and 130 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 140, disk controller 150, and I/O bridge 170 are connected to I/O interface 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 140 includes BIOS/UEFI code operable to detect resources within information handling system 100, to provide drivers for the resources, initialize the resources, and access the resources. BIOS/UEFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 4394 (Firewire) interface, a proprietary interface, or a combination thereof. Alternatively, solid-state drive 164 can be disposed within information handling system 100.

I/O bridge 170 includes a peripheral interface 172 that connects the I/O bridge to add-on resource 174, to TPM 176, and to network interface 180. Peripheral interface 172 can be the same type of interface as I/O channel 112 or can be a different type of interface. As such, I/O bridge 170 extends the capacity of I/O channel 112 when peripheral interface 172 and the I/O channel are of the same type, and the I/O bridge translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as I/O interface 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management device 190 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 100. In particular, management device 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management device 190 can include a network connection to an external management system, and the management device can communicate with the management system to report status information for information handling system 100, to receive BIOS/UEFI or system firmware updates, or to perform other task for managing and controlling the operation of information handling system 100.

Management device 190 can operate off of a separate power plane from the components of the host environment so that the management device receives power to manage information handling system 100 when the information handling system is otherwise shut down. An example of management device 190 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 190 may further include associated memory devices, logic devices, security devices, or the like, as needed or desired.

Figure 2:
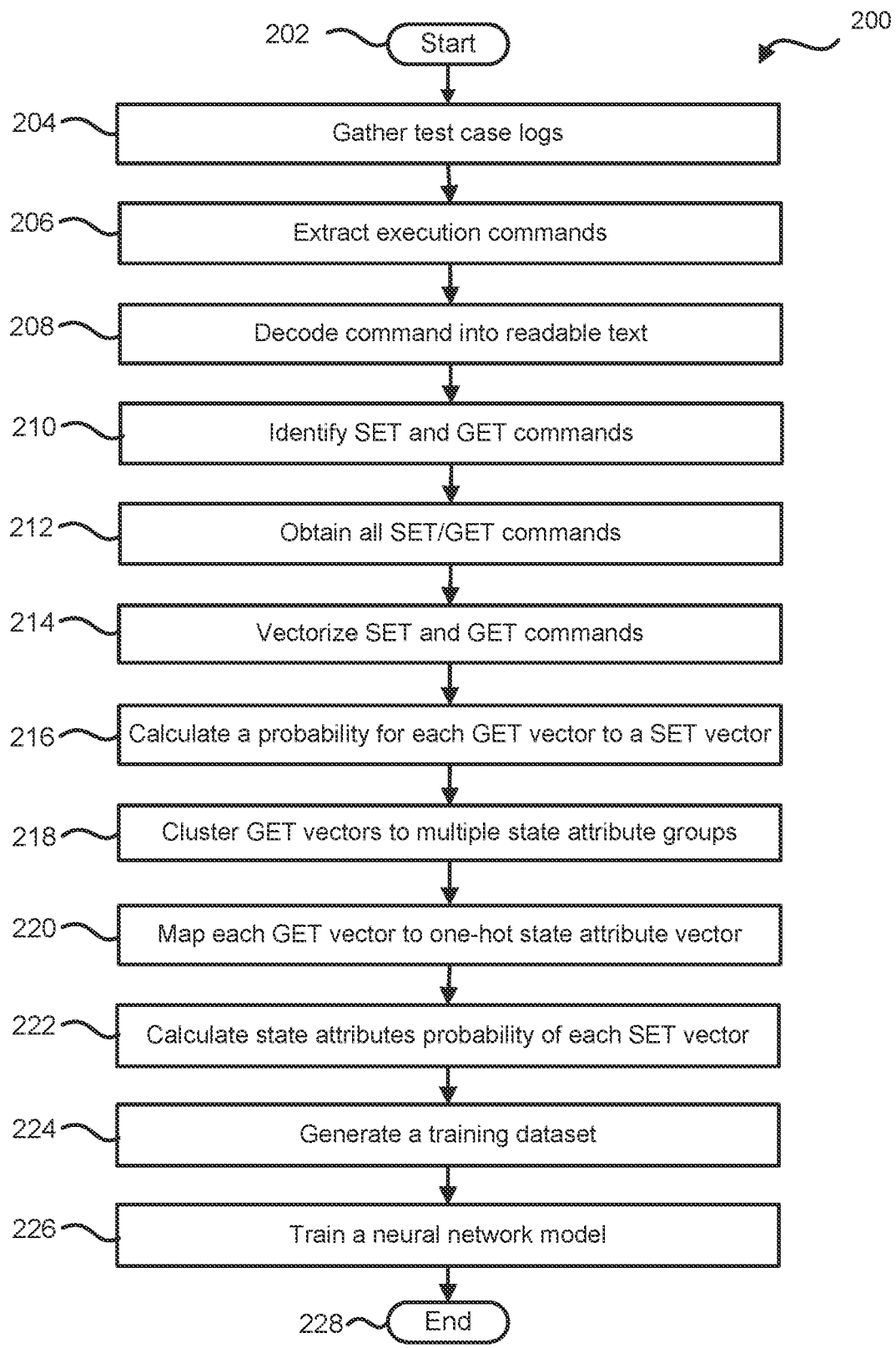
FIG. 2 is a flow diagram of a method for training a machine learning system to determine whether test steps of test cases have conflicts according to at least one embodiment of the present disclosure.

FIG. 2 illustrates a flow of a method 200 for training a machine learning system to determine whether test steps of test cases have conflicts according to at least one embodiment of the present disclosure, starting at block 202. In an example, method 200 may be performed by any suitable component including, but not limited to, processor 102 or 104 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 204, test case logs are gathered. In an example, the test case logs may be associated with different test cases of firmware testing data. In certain examples, the firmware testing may include steps that are time-intensive based on interactions with hardware components within the information handling system. One such time-intensive test step may be a system reboot of the information handling system. The amount of time consumed by the firmware test may be reduced by merging different test steps together. However, if conflicted test steps are merged, the firmware test may become unreliable. In certain examples, test steps of a firmware test may conflict based on a number of reasons. For example, one command in a test step may change one or more hidden states of the firmware, which in turn may affect a result of a later command.

At block 206, execution commands for the firmware test are extracted from the test case logs. At block 208, the extracted commands are decoded into readable text. In certain examples, the execution commands may be any suitable format of commands, such as binary/hexadecimal command. After the commands have been decoded, test step (SET) commands and groups of test steps (GET commands) are identified at block 210. At block 212, all SET and GET commands are obtained.

At block 214, the SET and GET commands are vectorized. In certain examples, each individual SET (S) command and individual GET (G) command may be vectorized into different vectors. In an example, the vectorization of the SET (S) commands and GET (G) commands may create a matrix for each individual SET (S) command and individual GET (G) command. At block 216, a probability for each GET and SET vector is calculated. In an example, the probability may be a discounted observation motivation probability $p_i$. The discounted observation motivation probability may be calculated for each GET vector $G_i$ to a SET vector $S_j$ where $i>j$.

At block 218, GET vectors a grouped in multiple state attribute groups or clusters. In an example, the GET vectors G may be clustered into any suitable number k of state attributes groups. In certain examples, each state attribute group may be a different state attribute for a firmware update including, but not limited to, an idle state, a downloading state, a downloaded state, a success state, an in progress state, and out of memory state, a connection lost state, a verification failed state, an unsupported image state, and an invalid location state. In an example, the training data may include z GET vectors. In certain examples, the z vectors may be clustered into w attribute categories. Therefore, each $G_i$ may be labeled to a scalar category identification.

At block 220, each GET vector is mapped to one-hot state attribute vector, $a_i$. In an example, the one-hot state attribute vector may be any suitable size, such as (1×k), and k may be the number of different attribute state groups or clusters. Based on mapping each GET vector $G_i$ to a one-hot state attribute vector $a_i$, the mapping may be defined as GET command →$G_i$→$a_i$. At block 222, state attributes probabilities for each SET vector are calculated. In an example, if a testcase has n SET and GET commands, a state attributes probability impacted by $aj_{th}$ SET command may be calculated with equation 1 below.

$$Aj = \sum_{i=j+1}^{n} \frac{p_i a_i}{\max\left(\sum_{I=j+1}^{n} p_i a_i\right)} \quad \text{EQ. 1}$$

In equation 1, $A_j$ is the state attributes probability, $p_i$ is a discounted observation motivation probability of an $i_{th}$ GET command. In an example, $p_i=0$ if the $i_{th}$ command is SET. Also in equation 1, $a_i$ is a one-hot state vector of state attributes of an $i_{th}$ GET command. In an example, the size of $a_i$ is 1×w, and w is a count of total state attribute labels.

At block 224, a training dataset is generated. In an example, the training dataset may be any suitable data generated from the commands of the testcase logs, such as the SET (S) commands and the corresponding state attributes probabilities (A). In certain examples, the training data set may be SET command ~ state attributes probability pairs (S~A pairs). The S~A pairs may be extracted and generated from the testcase execution logs via discounted observation motivation probability operations. At block 226, a neural network model is trained based on the training dataset, and the flow ends at block 228. In an example, the neural network model may be trained to utilize the state attribute probabilities to determine whether test steps are in conflict.

Figure 3:
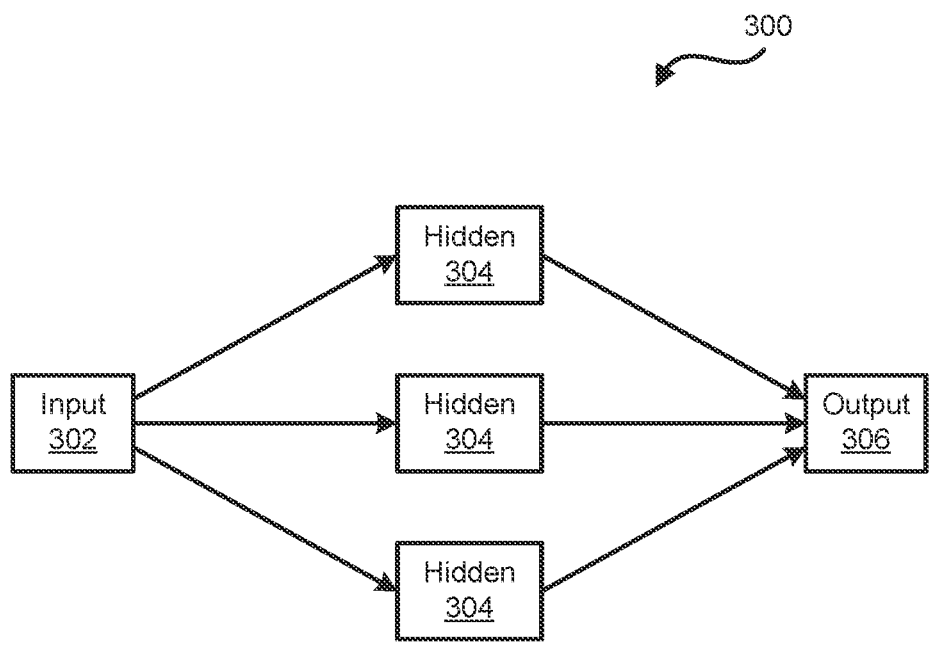
FIG. 3 is a block diagram a machine learning system according to at least one embodiment of the disclosure.

FIG. 3 illustrates a machine learning system 300 according to at least one embodiment of the disclosure. In an example, the machine learning system may be any suitable machine learning model, such as a neural network model. Machine learning system 300 may be substantially similar to neural network model trained in block 226 of FIG. 2. Machine learning system 300 includes an input layer 302, one or more hidden layers 304, and an output layer 306. Input layer 302 may receive any suitable data associated with an information handling system, such as information handling systems 100 of FIG. 1, and provide the data to hidden layers 304. In an example, testcase logs may be utilized as an input data to input layer 302 of machine learning system 300. Hidden layers 304 may perform one or more operations on the input data, such as SET commands and GET commands within the testcase logs, to calculate state attribute probabilities for test steps. In certain examples, hidden layers 304 may determine whether test steps of a firmware update are in conflict.

During training of machine learning system 300, testcase logs, may be utilized to calculate a conflict probability between test steps of a firmware update. In certain examples, the training of hidden layers 304 may build up a relationship between a test step (SET command) which will result in changing the state of an information handling system and the state attributes of the information handling system. The state attributes may be hidden externally by using proposed "discounted observation motivation probability" on a group of test steps (GET commands) which might observe the related state attributes. In an example, the training of hidden layers 304 may be performed in any suitable manner including, but not limited to, supervised learning, unsupervised learning, reinforcement learning, and self-learning. In an example, any machine learning model may be utilized for determining a user experience including, but not limited to, a linear regression model.

Figure 4:
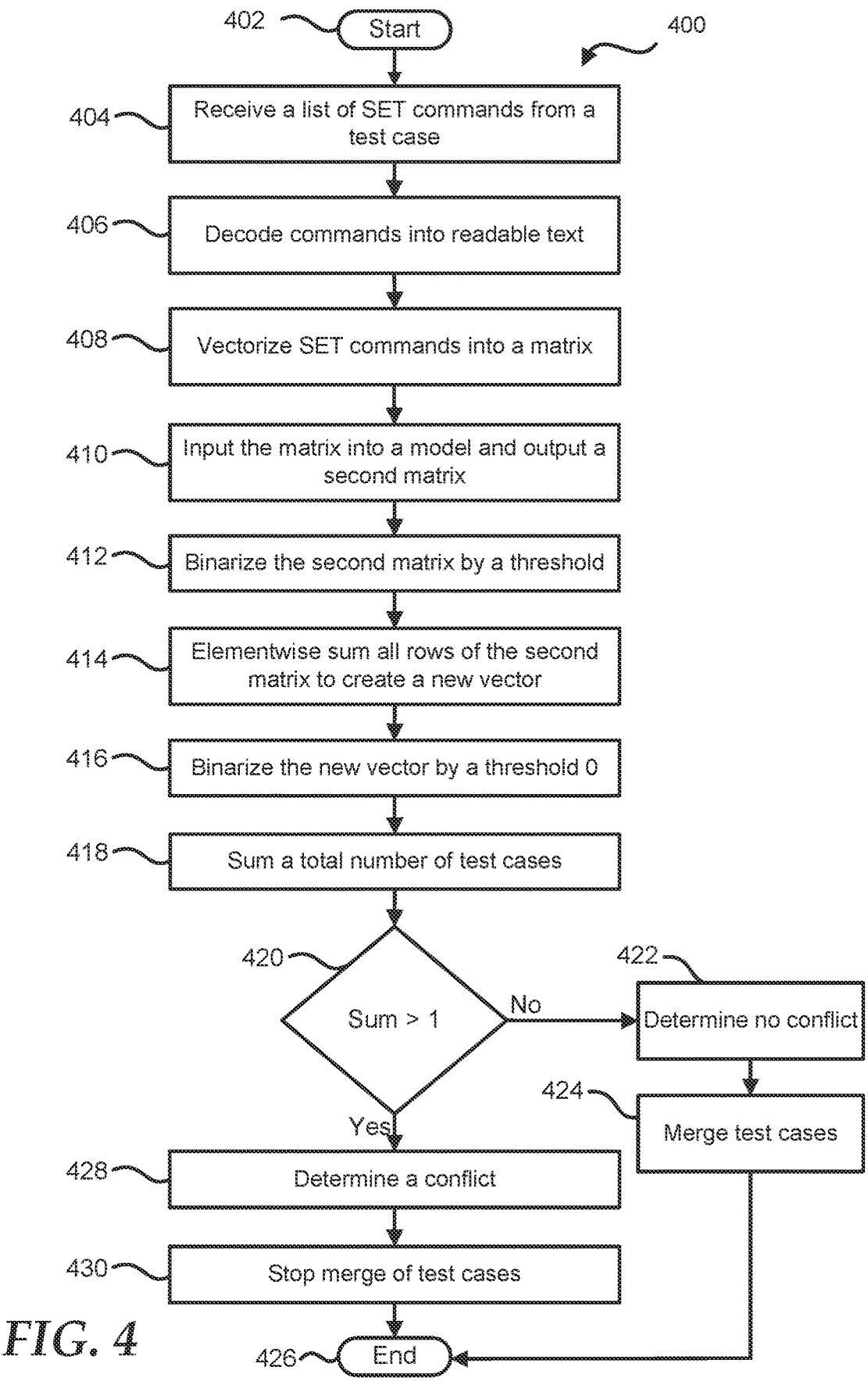
FIG. 4 is a flow diagram of a method for determining whether test steps of test cases have conflicts according to at least one embodiment of the present disclosure.

FIG. 4 illustrates a flow of a method 400 for determining whether test steps of test cases have conflicts according to at least one embodiment of the present disclosure, starting at block 402. In an example, method 400 may be performed by any suitable component including, but not limited to, processor 102 or 104 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 404, a list of SET commands is received from a test case. In an example, the list of SET commands in the test case may be the test steps to be performed during a firmware update. At block 406, the commands are decoded into readable text. In an example, intelligent platform management interface (IPMI) may be a common interface for communication with a baseboard management controller of an information handling system, such as information handling system 100 of FIG. 1. The IPMI commands may have a hex format, such that a GET command in hex may be 0x30 0xd1 0x0 0x9 0x1 0x00. In this example, the text data for the GET command may be OEM GET_FRU_LED_STATE 0 9 1 FRU_MARKER. Similarly, a SET command in hex may be 0x30 0xd0 0x0 0x9 0x1 0x00 0x00 0x00 0x00. In this example, the text data for the SET command may be OEM SET_FRU_LED_STATE 0 9 1 FRU_MARKER ON_DEFAULT OFF_DEFAULT FIRMWARE.

At block 408, the commands are vectorized into a matrix (A). In certain examples, the SET and GET commands may be vectorized in any suitable manner. For example, the command, such as an IPMI command, may be preprocessed by skipping particular words, such as digit, in the command, lowercase, split strings, and a vectorization method known in the art. In an example, an $i_{th}$ GET command may convert to a vector $G_i$, with a size 1×v and v may be a number of all feature words in the GET command. A $j_{th}$ SET command may convert to a vector $S_j$, with a size 1×u and u may be a number of all feature words in the SET command.

At block 410, the matrix (A) is input into a machine learning model and a second matrix ($A_t$) is output. In an example, the machine learning model may be substantially similar to neural network model trained in block 226 of FIG. 2. At block 412, the second matrix ($A_t$) is binarized by a particular threshold. In an example, the threshold may be a discriminator threshold t. In an example, the discriminator threshold t may be a hyper-parameter, and matrix A may be binarized into matrix ($A_t$ or A') via equation 2 below.

$$A'_{ij} = 1 \text{ if } A_{ij} > t, \text{ else } A'_{ij} = 0 \qquad \text{EQ. 2}$$

At block 414, all rows of the second matrix ($A_t$) are summed on an elementwise basis to create a new vector ($Al_i''$). At block 416, the new vector is binarized by a threshold 0 ($A_i'''$). At block 418, a total number of test cases are summed. In an example, the sum of n testcases may be calculated with equation 3 below.

$$A''' = \sum_{i=1}^{n} Al_i''' \qquad \text{EQ. 3}$$

At block 420, a determination is made whether the sum A''' is greater than or equal to one. If the sum is not greater than or equal to one, a determination is made that no conflict exists between test steps of the test cases at block 422. At block 424, the test cases are merged, and the flow ends at block 426. If, at block 420, the sum is determined to be greater than or equal to one, a determination is made that a conflict exists between test steps of the test cases at block 428. At block 430, the test cases are not merged, and the flow ends at block 426.

Figure 5:
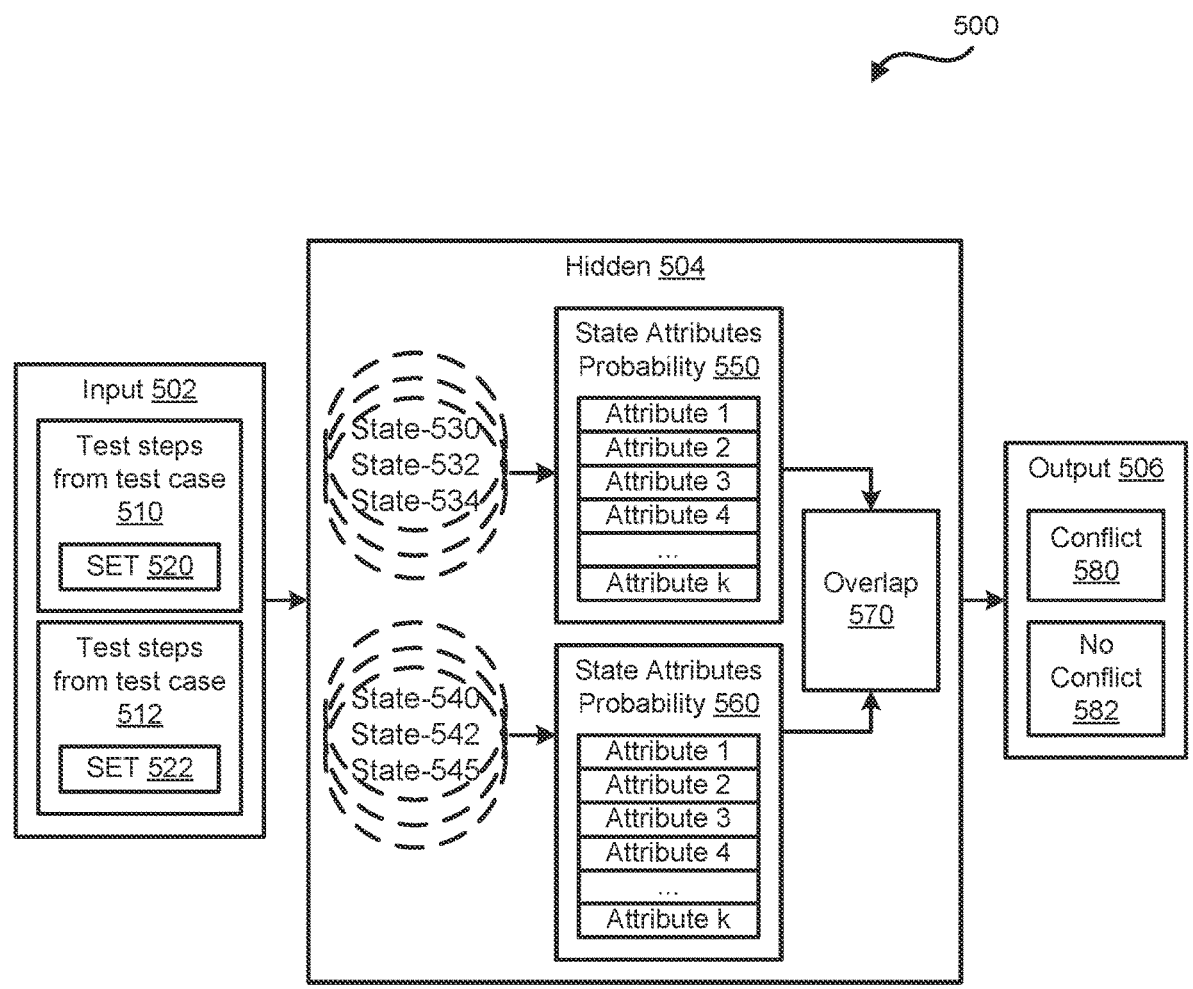
FIG. 5 is a block diagram a machine learning system according to at least one embodiment of the disclosure.

FIG. 5 illustrates a machine learning system 500 according to at least one embodiment of the disclosure. Machine learning system 500 includes an input layer 502, one or more hidden layers 504, and an output layer 506. Machine learning system 500 may be substantially similar to machine learning model 200 of FIG. 2. Input layer 502 may receive any suitable data associated with an information handling system, such as test steps from a test case 510 and test steps from a test case 512. In an example, test case 510 may include any suitable number of SET commands 510, and test case 512 may include any suitable number of SET commands 522. In an example, method 400 may be performed by any suitable component including, but not limited to, processor 102 or 104 of FIG. 1. While only two test cases 510 and 512 are illustrated in FIG. 5, machine learning system 500 may perform these operations on any suitable number of test cases without varying from the scope of this disclosure.

During execution of machine learning system 500, input layer 502 may SET commands 520 from test case 510 and SET commands from test case 512 and provide the SET commands to hidden layers 504 in any suitable manner. For example, input layer 502 may convert SET commands 520 and 522 into human readable text, individually vectorize each of the SET commands, and provide the different matrices to hidden layers 504. Hidden layers 504 may then cluster the GET commands from each of testcases 510 and 512 into multiple state attribute groups. For example, GET commands of SET commands 520 may be clustered into any suitable number of groups including, but not limited to, state attribute groups 530, 532, and 534. Similarly, GET commands of SET commands 522 may be clustered into any suitable number of groups including, but not limited to, state attribute groups 540, 542, and 544.

In an example, hidden layers 504 may calculate state attributes probabilities 550 for state attribute groups 530, 532, and 534, and calculate state attributes probabilities 560 for state attribute groups 540, 542, and 544. State attributes probabilities 550 may include different probabilities for any suitable number of state attributes, such as state attribute 1, state attribute 2, state attribute 3, state attribute 4, and state attribute k. State attributes probabilities 560 may include different probabilities for any suitable number of state attributes, such as state attribute 1, state attribute 2, state attribute 3, state attribute 4, and state attribute k. In certain examples, a processor, such as processor 102 or 104 of information handling system 100 in FIG. 1, may estimate state attribute probability matrices (A) 550 and 560 based on a list of SET command vectors S. In an example, the estimated state attribute probability matrices (A) may be calculated via equation 4 below.

$$A = f(S) \quad \text{EQ. 4}$$

In equation 4 above, A is an estimated state attribute probability matrix, S is a SET command vector, and the function $f$ is learned by a neural network, such as neural network 500. For example, the function $f$ may utilize a discounted observation motivation probability to determine an estimated state attribute probability. In an example, a testcase may contain a lot of SET and GET commands. However, there may not be any explicit information to describe which GET command may be performed in a particular order to observe changing state attributes that may be affected by a particular SET command. This metric, such as how a GET command may be affected by a particular SET command, may be defined as an observation motivation probability. In an example, a discounted model may be utilized to calculate the observation motivation probability from SET commands and GET commands sequences. In certain examples, the observation motivation probability may exponentially decrease according to the distance between a particular SET command and a corresponding GET command in the testcase.

In certain examples, the observation motivation distance between a SET command and a GET command may be defined or calculated by any suitable manner. For example, the observation motivation distance may be determined by merging adjacent SET commands into a single SET command and determining the motivation distance from a GET command to a SET command based on the number of SET commands between he GET command and SET command. An exemplary sequence of commands in a testcase, such as test case 510, is illustrated in Table 1 below.

In Table 1, a processor, such as processor 102 or 104 of information handling system 100 in FIG. 1, may merge SET commands 2 and 3 and as a result the SET commands become SET-1', SET-2', and SET-3'. Table 1 illustrates the distance between GET commands and a prior SET command in the sequence of commands based on the number of SET commands between the GET command and the prior SET command. For example, the GET command in Cmd idx 2 has a distance (d) of zero from SET-1', the GET command in Cmd idx 5 has a distance (d) of one from SET-1', the GET command in Cmd idx 6 has a distance (d) of one from SET-1', the GET command in Cmd idx 7 has a distance (d) of one from SET-1', the GET command in Cmd idx 9 has a distance (d) of two from SET-1', and the GET command in Cmd idx 10 has a distance (d) of two from SET-1'.

The GET command in Cmd idx 5 has a distance (d) of zero from SET-2', the GET command in Cmd idx 6 has a distance (d) of zero from SET-2', the GET command in Cmd idx 7 has a distance (d) of zero from SET-2', the GET command in Cmd idx 9 has a distance (d) of one from SET-2', and the GET command in Cmd idx 10 has a distance (d) of one from SET-2'. The GET command in Cmd idx 5 has a distance (d) of zero from SET-3, the GET command in Cmd idx 6 has a distance (d) of zero from SET-3, the GET command in Cmd idx 7 has a distance (d) of zero from SET-3, the GET command in Cmd idx 9 has a distance (d) of one from SET-3, and the GET command in Cmd idx 10 has a distance (d) of one from SET-3. The GET command in Cmd idx 9 has a distance (d) of zero from SET-4, and the GET command in Cmd idx 10 has a distance (d) of zero from SET-4.

In certain examples, a discounted observation motivation probability of each GET command may be defined or calculated by any suitable manner. For example, the discounted observation motivation probability may be determined by equation 5 below.

$$p = \alpha \times \gamma^d \quad \text{EQ. 5}$$

In equation 5 above, $\alpha$ is a base probability, which is a hyper-parameter that is between (0,1). Also, $\gamma$ is the discount rate, which is a hyper-parameter that is between (0,1). An exemplary sequence of commands in a testcase, such as test case 510, with a $\alpha=1$ and $\gamma=0.5$ is illustrated in Table 2 below.

TABLE 1

| | Sequence of Commands | | | | | | | | | |
|---|---|---|---|---|---|---|---|---|---|---|
| Cmd idx | 1 | 2 | 3 | 4 | 5 | 6 | 7 | 8 | 9 | 10 |
| Cmd Type | SET | GET | SET | SET | GET | GET | GET | SET | GET | GET |
| SET idx | 1 | | 2 | 3 | | | | 4 | | |
| Merged SET idx | 1' | | 2' | | | | | 3' | | |
| d to SET-1 | | 0 | | | 1 | 1 | 1 | | 2 | 2 |
| d to SET-2 | | | | | 0 | 0 | 0 | | 1 | 1 |
| d to SET-3 | | | | | 0 | 0 | 0 | | 1 | 1 |
| d to SET-4 | | | | | | | | | 0 | 0 |

TABLE 2

Sequence of Commands

| Cmd idx | 1 | 2 | 3 | 4 | 5 | 6 | 7 | 8 | 9 | 10 |
|---|---|---|---|---|---|---|---|---|---|---|
| Cmd Type | SET | GET | SET | SET | GET | GET | GET | SET | GET | GET |
| SET idx | 1 |  | 2 | 3 |  |  |  | 4 |  |  |
| Merged SET idx | 1' |  | 2' |  |  |  |  | 3' |  |  |
| d to SET-1 |  | 1 |  |  | 0.5 | 0.5 | 0.5 |  | 0.25 | 0.25 |
| d to SET-2 |  |  |  |  | 1 | 1 | 1 |  | 0.5 | 0.5 |
| d to SET-3 |  |  |  |  | 1 | 1 | 1 |  | 0.5 | 0.5 |
| d to SET-4 |  |  |  |  |  |  |  |  | 1 | 0 |

In an example, sequence of commands in Table 2, such as sequence of SET commands and GET commands, may be substantially similar to the sequence of commands in Table 1. In certain examples, a processor, such as processor 102 or 104 of information handling system 100 in FIG. 1, may calculate the discounted observation motivation probability for each GET command in Table 2. For example, the GET command in Cmd idx 2 has discounted observation motivation probability (p) of one associated with SET-1', the GET command in Cmd idx 5 has discounted observation motivation probability (p) of 0.5 associated with SET-1', the GET command in Cmd idx 6 has discounted observation motivation probability (p) of 0.5 associated with SET-1', the GET command in Cmd idx 7 has discounted observation motivation probability (p) of 0.5 associated with SET-1', the GET command in Cmd idx 9 has discounted observation motivation probability (p) of 0.25 associated with SET-1', and the GET command in Cmd idx 10 has discounted observation motivation probability (p) of 0.25 associated with SET-1'.

The GET command in Cmd idx 5 has discounted observation motivation probability (p) of one associated with SET-2', the GET command in Cmd idx 6 has discounted observation motivation probability (p) of one associated with SET-1', the GET command in Cmd idx 7 has discounted observation motivation probability (p) of one associated with SET-2', the GET command in Cmd idx 9 has discounted observation motivation probability (p) of 0.5 associated with SET-2', and the GET command in Cmd idx 10 has discounted observation motivation probability (p) of 0.5 associated SET-2'. The GET command in Cmd idx 5 has discounted observation motivation probability (p) of one associated with SET-3, the GET command in Cmd idx 6 has discounted observation motivation probability (p) of one associated with SET-3, the GET command in Cmd idx 7 has discounted observation motivation probability (p) of one associated with SET-3, the GET command in Cmd idx 9 has discounted observation motivation probability (p) of 0.5 associated with SET-3, and the GET command in Cmd idx 10 has discounted observation motivation probability (p) of 0.5 associated with SET-3. The GET command in Cmd idx 9 has discounted observation motivation probability (p) of one associated with SET-4, and the GET command in Cmd idx 10 has discounted observation motivation probability (p) of one associated with SET-4.

As stated above, hidden layers 504 may utilize the discounted observation motivation probability (p) for the GET commands to calculate state attribute probabilities 550 and 560. In an example, hidden layers 504 may utilize state attribute probabilities 550 and 560 to determine whether any test steps overlap 570 exist between test steps 520 of testcase 510 and test steps 522 of testcase 512. Based on whether overlap 570 exists between test steps 520 of testcase 510 and test steps 522 of testcase 512, hidden layers 504 may provide an output layer 506 of whether SET commands are in conflict. In an example, given a list of SET commands from n different test cases $S_l$ (l=[1 . . . n]), hidden layers 504 may generate a list of $A'_l$, (l=[1 . . . n]), wherein $A'_l$, is a matrix. Based on determined A', hidden layers 504 may convert $A'_l$, into another matrix $A''_l$ by summing all rows in $A'_l$, and binarizing the matrix by a threshold 0 to get individual impacted state attributes vectors by each testcase. In an example, if a total impacted state attributes vector: $A''' = \sum_{i=1}^{n} A''_l$. Based on this calculation, if max $(A''') > 1$, then SET commands are in conflict. However, if max $(A''') \leq 1$, then SET commands are not in conflict.

If overlap 570 exists, a conflict notification 580 may be provided at output layer 506. In response to conflict notification 580, a processor, such as processor 102 or 104 of information handling system 100 in FIG. 1, may prevent or end merging of test steps. If overlap 570 does not exist, a no conflict notification 582 may be provided at output layer 506. In response to no conflict notification 582, a processor, such as processor 102 or 104 of information handling system 100 in FIG. 1, may merge test steps.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:

a memory configured to store a list of test commands for the information handling system, wherein the list of test commands includes multiple test steps in a plurality of test cases; and a processor to communicate with the memory, the processor to:

receive the list of test commands associated with the test cases;

provide data associated with the list of test commands to an input layer of a state attributes probability machine learning model;

output, by an output layer of the state attributes probability machine learning model, a state attributes probability, wherein the state attributes probability identifies an overlap of state attributes of test steps in the test cases;

based on the state attributes probability, determine whether the test steps of the test cases are in conflict, wherein the determination includes:
  receive an output matrix from the state attributes probability machine learning model;
  binarize the output matrix;
  elementwise sum all rows of the output matrix to create a new vector;
  binarize the new vector; and
  sum a total number of test cases in the new vector, wherein the conflict results from the test steps of the test cases utilizing different firmware states;
in response to the test steps not being in conflict, merge the test cases; and
in response to the test steps being in conflict, stop a merging of the test cases.

2. The information handling system of claim 1, wherein prior to the reception of the list of test commands, the processor further to:
  retrieve test case logs, wherein the test case logs include a plurality of execution commands;
  based on the execution commands from the test case logs, calculate a state attributes probability;
  generate a training dataset; and
  train the state attributes probability machine learning model based on the training dataset.

3. The information handling system of claim 2, wherein prior to the data associated with the list of test commands being provided to the state attributes probability machine learning model, the processor further to:
  extract commands from the list of test commands;
  decode the commands into readable text; and
  vectorize test step commands of the commands into a matrix, wherein the data associated with the list of test commands provided to the state attributes probability machine learning model includes the matrix.

4. The information handling system of claim 1, wherein the test steps are not in conflict when the sum is less than one.

5. The information handling system of claim 1, wherein the test steps are in conflict when the sum is greater than one.

6. A method comprising:
  receiving, by a processor of an information handling system, a list of test commands including multiple test steps in a plurality of test cases;
  providing data associated with the list of test commands to an input layer of a state attributes probability machine learning model;
  outputting, by an output layer of the of the state attributes probability machine learning model, a state attributes probability, wherein the state attributes probability identifies an overlap of state attributes of test steps in the test cases;
  based on the state attributes probability, determining whether the test steps of the test cases are in conflict, wherein the conflict results from the test steps of the test cases utilizing different firmware states;
  in response to the test steps not being in conflict, merging the test cases; and
  in response to the test steps being in conflict, stopping a merging of the test cases.

7. The method of claim 6, wherein prior to the receiving of the list of test commands, the method further comprises:
  retrieving test case logs, wherein the test case logs include a plurality of execution commands;
  based on the execution commands from the test case logs, calculating a state attributes probability;
  generating a training dataset; and
  training the state attributes probability machine learning model based on the training dataset.

8. The method of claim 7, wherein prior to the data associated with the list of test commands being provided to the state attributes probability machine learning model, the method further comprises:
  extracting commands from the list of commands;
  decoding the commands into readable text; and
  vectorizing test step commands of the commands into a matrix, wherein the data associated with the list of commands provided to the state attributes probability machine learning model includes the matrix.

9. The method of claim 6, wherein determining of whether the test steps of the test cases are in conflict includes the method further comprising: receiving an output matrix from the state attributes probability machine learning model; and binarizing the output matrix.

10. The method of claim 9, further comprising:
  elementwise summing all rows of the output matrix to create a new vector;
  binarizing the new vector; and
  summing a total number of test cases in the new vector.

11. The method of claim 10, wherein the test steps are not in conflict when the sum is less than one.

12. The method of claim 10, wherein the test steps are in conflict when the sum is greater than one.

13. A method comprising:
  receiving, by a processor of an information handling system, a list of test commands including multiple test steps in a plurality of test cases;
  extracting commands from the list of test commands;
  decoding the commands into readable text;
  vectorizing test step commands of the commands into a matrix;
  providing the matrix associated with the list of commands to an input layer of a state attributes probability machine learning model;
  outputting, by an output layer of the of the state attributes probability machine learning model, a state attributes probability, wherein the state attributes probability identifies an overlap of state attributes of test steps in the test cases;
  determining whether the test steps of the test cases are in conflict, wherein the test steps are in conflict if the state attributes probability is greater than or equal to one, wherein the test steps are not in conflict if the state attributes probability is less than one, wherein the conflict results from the test steps of the test cases utilizing different firmware states; and
  if the test steps are not in conflict, then merging the test cases, otherwise stopping a merging of the test cases.

14. The method of claim 13, wherein prior to the receiving of the list of test commands, the method further comprises:
  retrieving test case logs, wherein the test case logs include a plurality of execution commands;
  based on the execution commands from the test case logs, calculating a state attributes probability;
  generating a training dataset; and
  training the state attributes probability machine learning model based on the training dataset.

15. The method of claim 13, wherein determining of whether the test steps of the test cases are in conflict includes the method further comprising: receiving an output matrix from the state attributes probability machine learning model; and binarizing the output matrix.

16. The method of claim 15, further comprising:
elementwise summing all rows of the output matrix to create a new vector;
binarizing the new vector; and
summing a total number of test cases in the new vector.

* * * * *